(12) United States Patent
Iddan

(10) Patent No.: US 8,089,626 B2
(45) Date of Patent: Jan. 3, 2012

(54) MINISCULE-SIZE PHOTO-SPECTROMETER UNITS

(75) Inventor: Gavriel J. Iddan, Haifa (IL)

(73) Assignee: Medingo, Ltd., Yoqneam (IL)

( * ) Notice: Subject to any disclaimer, the term of this patent is extended or adjusted under 35 U.S.C. 154(b) by 176 days.

(21) Appl. No.: 12/226,931

(22) PCT Filed: May 1, 2007

(86) PCT No.: PCT/IL2007/000533
§ 371 (c)(1),
(2), (4) Date: Oct. 31, 2008

(87) PCT Pub. No.: WO2007/129305
PCT Pub. Date: Nov. 15, 2007

(65) Prior Publication Data
US 2009/0097025 A1   Apr. 16, 2009

(30) Foreign Application Priority Data
May 2, 2006 (IL) .......................... 175376

(51) Int. Cl.
*G01J 3/28* (2006.01)
(52) U.S. Cl. ........................................ 356/326
(58) Field of Classification Search ........... 356/326–328
See application file for complete search history.

(56) References Cited

U.S. PATENT DOCUMENTS

| | | | |
|---|---|---|---|
| 6,303,934 B1 * | 10/2001 | Daly et al. | 250/339.02 |
| 6,399,405 B1 * | 6/2002 | Chen et al. | 438/22 |
| 6,608,679 B1 | 8/2003 | Chen et al. | |
| 7,061,618 B2 | 6/2006 | Atia et al. | |
| 2002/0074554 A1 | 6/2002 | Sweatt et al. | |
| 2004/0196458 A1 | 10/2004 | Shimizu et al. | |
| 2006/0092414 A1 | 5/2006 | Geshwind et al. | |
| 2006/0187461 A1 | 8/2006 | Atia et al. | |
| 2006/0229512 A1 * | 10/2006 | Petisce et al. | 600/347 |
| 2006/0232781 A1 | 10/2006 | Kranz et al. | |
| 2006/0262303 A1 | 11/2006 | Bonne et al. | |
| 2008/0123095 A1 * | 5/2008 | Hubner et al. | 356/328 |

FOREIGN PATENT DOCUMENTS

JP        09 089669    4/1997
WO      WO 97/02475 A   1/1997

OTHER PUBLICATIONS

International Search Report, PCT Application No. PCT/IL2007/000533, date of mailing Sep. 17, 2007.

* cited by examiner

*Primary Examiner* — Kara E Geisel
(74) *Attorney, Agent, or Firm* — Mintz Levin Cohn Ferris Glovsky and Popeo, P.C.

(57) ABSTRACT

A device and a method for implementing a photo-spectrometer unit (20), or PSU (20), for use with a spectrometry system (100) having optical means (12), and electronic means (13) is disclosed. The PSU is formed in a two-step manufacturing process to form a chip having a monolithic structure. The chip has a first surface and second surface. During the first manufacturing process step, optical means are integrally formed on the first surface (301), and during the second manufacturing process step, electronic means are formed on the second surface (302). The chip is transparent to electromagnetic radiations, and the PSU has at least one optical deflecting element (32) for guiding received radiations through the chip, for establishing direct optical path coupling between an optical element formed on the first surface and an electronic element formed on the second surface.

23 Claims, 4 Drawing Sheets

MINISCULE-SIZE PHOTO-SPECTROMETER UNITS

CROSS REFERENCE TO RELATED APPLICATIONS

This application claims benefit to PCT Application No. PCT/IL2007/000533, having an international filing date of May 1, 2007, and Israel Patent Application No. 175376, filed May 2, 2006. Each of the foregoing disclosures is expressly incorporated herein by reference in its entirety.

TECHNICAL FIELD

The present invention relates in general to spectrum analyzers, and in particular to a device and a method for implementing photo-spectrometer units of minuscule size built and structured as a single monolithic block of substrate material.

DEFINITIONS

A photo-spectrometer is a spectral measurement device dedicated to the analysis of incoming radiant energy that is received downstream of a sample, which is illuminated upstream.

A monolithic device is an integral structure that is formed or carved out of a single piece or block of material, such as for example, by application of Micro-Electro-Mechanical Systems technology, or MEMS technology, to a semiconductor substrate material. A monolithic device integrally includes all the components necessary for operation, does not contain moving elements, and averts the need of assembling components.

Minuscule size refers to sizes of the order of magnitude of the dimensions of electronic chips, such as in the range of for example, a few square millimeters and less.

A sample is an object, or a substance, or matter under inspection.

BACKGROUND ART

The ever increasing need for on line, real time and compact analyte identification for example in the area of medicine, may be answered by the use of MEMS and/or MEOMS, or Micro-Electro-Optical-Mechanical Systems technology.

It is known that spectroscopy in general and absorption spectroscopy specifically, may be applied for the purpose of analyte detection as has been shown in the past in numerous publications and patents.

FIG. 1 is a schematic block-diagram representation of a known prior art 100 for the analysis of a sample by spectroscopy. In principle, spectroscopy employs upstream illumination means 10 as a source of radiations that are beamed onto a sample S. The radiation(s) exiting the illuminated sample S usually takes advantage of optical guiding means 11, such as optical fibers elements for example, to reach a photo-spectrometer unit 20, or PSU 20.

In broad terms, the photo-spectrometer unit 20, or PSU 20 could be described as including optical means 12 and electronic means 13. The optical guiding means 11 thus lead radiations to the optical means 12 including the optical elements 121. Radiations exiting the optical elements 121 are directed onto wavelength separator means 14, which is also an optical element 121, where the received radiations are separated into rays of different wavelength, if necessary. Although not shown in FIG. 1, further optical elements 121 may be added downstream of the separator means 14.

Radiations now travel from the optical means 12 to the electronic means 13 which include electronic elements 131 such as photo-electronic means, processing means and electrical and/or electronic circuits.

The detection means 15, which is an electronic element 131, receives the output of the separator means 14 and takes spectral measurements that are fed into appropriate signal processing means 16 from which they emerge as spectrometry result output signals 17. Although not shown in FIG. 1, electrical and electronic circuits may be included into the processing means 16, or be separate therefrom.

In practice a spectroscopy system 100 as shown in symbolic form in FIG. 1 includes a plurality of elements and components that are mostly fabricated separately and thereafter, need to be carefully optically aligned and assembled. This explains the size and the cost of such devices, which become even more expensive when miniaturized.

Background art US patents exemplify the complexity of previously known spectroscopy systems and spectrometry devices.

U.S. Pat. No. 6,608,679 to Chen, et al. discloses a method for spectrophotometric analysis defined in a monolithic substrate and comprising a movable support structure on the monolithic substrate. Chen, et al. thus divulge an assembly that has a moveable structure.

U.S. Pat. No. 7,061,618 and US Patent Application No. 20060187461 both by Atia, et al., disclose integrated spectroscopy systems wherein a source system, a Fabry-Perot filter system comprising a MEMS tunable movable mirror die, and a detector system are integrated on a common bench, in a common package. Hence, Atia, et al. divulge an integrated spectroscopy systems assembled on a common bench and having moving parts.

In US Patent Application No. 20060092414, Geshwind, et al. teach a spectral measurement device and recite a spectral measurement system assembly, which is a solid state device with no moving parts. However, a spectrometer assembly of elements is different from a monolithic photo-spectrometer device.

US Patent Application No. 20060232781 by Kranz et al. divulges a miniature Fourier transform spectrophotometer wherein after fabrication of the microoptics bench 3, the microoptical components forming the interferometer are placed into their respective mounts and attached with a UV-curable adhesive. The mounts on the microoptics bench perform both alignment and attachment functions. The spectrophotometer disclosed by Kranz et al. is thus an assembly of components.

US Patent Application No. 20060262303 by Bonne, Ulrich, et al. discloses an optical micro spectrometer implemented as a wafer-level assembly using a grating and compact light source, which is applicable to fluid composition analysis. Bonne, Ulrich, et al. thus divulge a small size assembly of wafers.

The background art does not implement a spectroscopy system 100 having a monolithic photo-spectrometer structure 20 without moving parts, built as a chip of substrate material including integrally formed optical means 12 and electronic means 13, and made by only a two fabrication process steps, to provide a miniaturized monolithic photo-spectrometer 20 for use ex-vivo and in-vivo.

DISCLOSURE OF INVENTION

Spectroscopy systems of relatively small size are known in the art but their price is generally in opposite exponential relation to their size. It is therefore desired to lower the costs of production of the various optical and electronic means, the costs of assembly, and the costs of inspection. Such an endeavor may be achieved by building the main portion of the spectroscopy system, namely the photo-spectrometer, as a unitary structure etched out of a single monolithic block of semiconductor substrate material, built on a single chip and without any moving elements in only two manufacturing process steps. Without production-assembly steps and with much less inspection steps, the application of well-known microelectronics fabrication techniques permits to manufacture minuscule-size monolithic photo-spectrometry devices at low cost.

In a simplified example chosen for the sake of ease of description, the first manufacturing process step consists of forming the PSU into a monolithic structure as a chip of substrate material including integrally formed optical means sculptured on say one side of the substrate. The optical means include a deflecting element built on the first side of the substrate material and able to deflect incoming radiations through the thickness of the radiation transparent substrate to the other side of the substrate material.

When done, the electronic means having electronic elements are deposited on the other side of the substrate in a second manufacturing process step, in such a manner that an electronic element is formed in proper optical alignment to collect radiations deflected by the deflecting element. Incoming radiations are thus collected on one side of the substrate material and pass in direct optical path coupling through the optical means. Then the deflecting element transmits the radiations to the electronic means which output electrical output result signals.

Manufacturing takes advantage of well-known MEMS, MEOMS and micro-electronic techniques including for example lithography or epitaxy, or dry etching, or a combination of those techniques, and/or a combination of emerging manufacturing technologies. Thereby, a miniaturized monolithic photo-spectrometer made as a single silicon chip or die may be supplied at a never-before achieved minuscule-size and low cost.

BRIEF DESCRIPTION OF DRAWINGS

Non-limiting embodiments of the invention will be described with reference to the following description of exemplary embodiments, in conjunction with the figures. The figures are generally not shown to scale and any measurements are only meant to be exemplary and not necessarily limiting. In the figures, identical structures, elements, or parts that appear in more than one figure are preferably labeled with a same or similar number in all the figures in which they appear, in which.

BEST MODES FOR CARRYING OUT THE INVENTION

Figure 2:
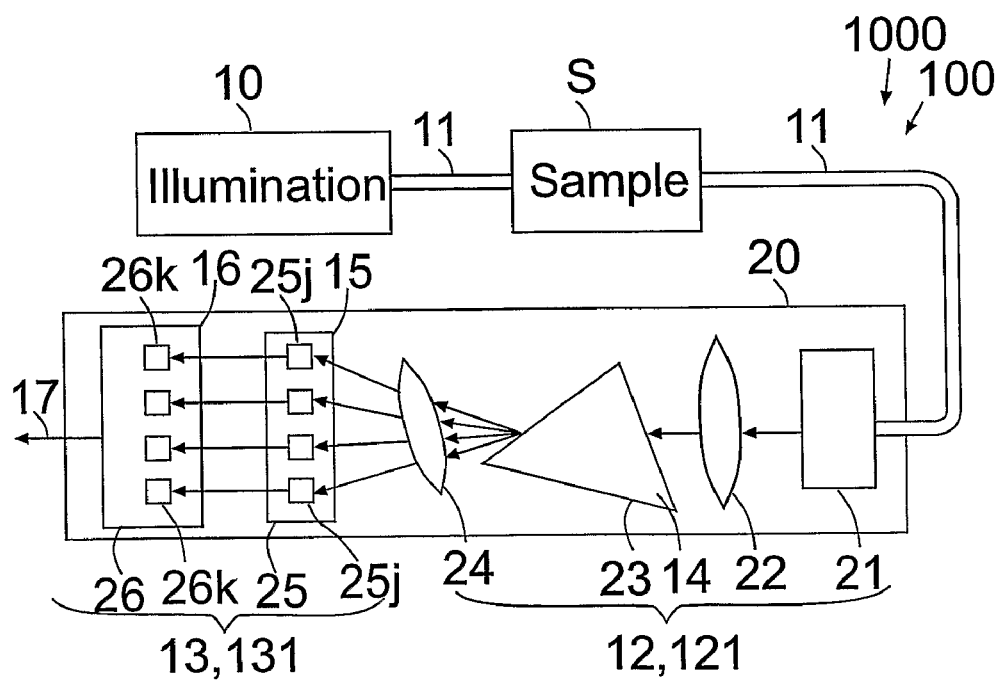
FIG. 2 depicts a conceptual illustration of an exemplary embodiment 1000 showing an example of a spectrometry system 100.

FIG. 2 depicts a conceptual illustration of an embodiment 1000 showing an example of a spectrometry system 100. Radiations emitted by illumination means 10, or by an illumination source 10, may be carried to the sample S by optical guiding means 11, such as fiber optics for example. Other optical guiding means 11, such as for example optical elements or direct optical path coupling, may be used to lead radiations exiting from the sample S to a photo-spectrometer unit 20, or PSU 20, for which they are input signals.

The terms radiation and radiations are both regarded as being constructed in singular and in plural.

In FIG. 2 the input signals received by the photo-spectrometer unit 20, or PSU 20, are fed first into the optical means 12 having optical elements 121, and then to electronic means 13 including electronic elements 131. An optical element 121 such as an optical coupler 21 receives the input signals wherefrom they may be delivered and guided to pass through collimating optics 22 for example. Rays from the collimating optics 22 reach separator means 14, which may be implemented for example as an optical prism 23 that splits the incoming radiations into multiple rays of different wavelength. The output spectrum of radiations exiting the optical prism 23 is received by further optical elements 121 implemented for example as focusing optics 24 that may direct the received radiations onto detection means 15, such as a common detector element 25, or an array of, or separate single wavelength dedicated optical detectors 25. Then, signal-processing means 16 such as a single common processor 26 for example, may collect the output of the detector or array 25 and provide output signals 17, which may be directed to an I/O device.

Reference is now made to the various elements of the spectrometry system 100 shown in FIG. 2.

The illumination means 10 may be selected out of various types of radiation emitting devices including for example: a broadband illumination source 10 covering the entire required spectral bandwidth, or a wavelength-tunable light source, or although not shown in the Figs., a bank or an array of discrete illumination sources $10i$, where $i=[1, 2, 3, \ldots m]$, and where each discrete illumination source $20i$ covers a portion of the required spectral band. An array of monochromatic illuminators associated with respective narrow band filters, also present a practical option for limiting the spectrum of illumination to any desired range.

Broadband illumination sources 10 are typically miniature incandescent lamps, or glow bars, or halogen, Xenon, or Quartz lamps, while narrow band illumination sources 10 are for example small solid state LEDs, or laser diodes, or electro-luminescent plastic devices, or gas diodes, evidently chosen according to their relevant spectral range.

An upstream illumination source 10 successively flashing single different wavelength illumination coupled in association with a downstream matching wavelength detector elements provides maximal efficiency but evidently has the drawback of requiring a plurality of single wavelength illumination sources and a plurality of matching detectors 25. In short, maximal efficiency is obtained when the illumination spectrum matches the detectors' spectrum. In contrast, a broadband illumination source 10 will necessitate wavelength separation means, which results in a lower detection efficiency.

The duration of the illumination of the sample S depends on the absorption properties thereof: The more absorbing, the longer the illumination time required. It is noted that the sample S may consist of any substance permitting the transmission of radiant energy therethrough, including organic and inorganic substances, as well as fluids and gasses. For example, the sample S may be disposed ex vivo, or in vivo, or include mono- or multi-layered human tissue, such as blood, skin, and adipose tissue. Radiant energy is for example electromagnetic radiation, such as IR radiations.

The optical guiding means 11 may lead radiations received from an upstream illumination source 10 to an examined object or sample S, and from the sample S to the downstream disposed PSU 20. The optical guiding means 11 may include for example optical fibers, and/or an appropriately configured lens system specifically accommodated to match the required optical guide functions. Optical coupling may also be implemented by direct optical coupling without the use of fiber optics.

Reference is now made to the various means and elements of the photo-spectrometer 20, or PSU 20 shown in FIG. 2

Optical means 12 of the PSU 20 including optical elements 121 such as for example an optical coupler 21, collimating optics 22, separator means 14, and focusing optics 24, are now described first.

The PSU 20 preferably receives the output radiations exiting from the sample S via an optical element 121 such as an optical coupler 21, which may both split and drive the incoming radiation waves into co-alignment with the various downstream optically aligned elements of the PSU 20. An optical coupler 21 may be implemented by various means, amongst others, a slit, a notch, and a pre-filter.

Collimating optics 22, may be necessary to transmit the output radiation waves received from the optical coupler 21 to wavelength separation means 14, say to an optical prism 23. The collimating optics 22 may be formed and disposed downstream of the optical coupler 21 and may be configured to include for example one or a combination of one or more optical element 121, such as optical lenses, mirrors, slits, and pinholes.

The optical prism 23, shown as an example only in FIG. 2, may be replaced by as a grating, or a bank of optical filters capable of spatial decomposition of the radiations, which may then be delivered to downstream focusing optics 24.

The focusing optics 24 may collect the output spectrum from the optical prism 23 and direct that output onto an electronic element 131 such as detection means 15 pertaining to the electronic means 13, which are now described.

The detection means 15 may be fabricated for example as a multi-wavelength common detector 25 or as an array of separate single wavelength dedicated optical detectors 25$j$, with j=[1, 2, 3, . . . n]. The detection means 15 are evidently configured in matching accordance with the upstream portion of the spectrometry system 100 and of the PSU 20.

The signal processing means 16 accept the output from the detection means 15, and may be implemented as a common processor 26, or as single separate processors 26$k$, with k=[1, 2, 3, . . . p]. The discrete integer number n of dedicated optical detectors 25$j$ is possibly equal to or different from the discrete integer number p of single separate processors 26$k$.

Finally, the output of the signal processing means 16 exit out of the electronic means 13 as PSU 20 spectrometry result output signals 17.

Figure 3:
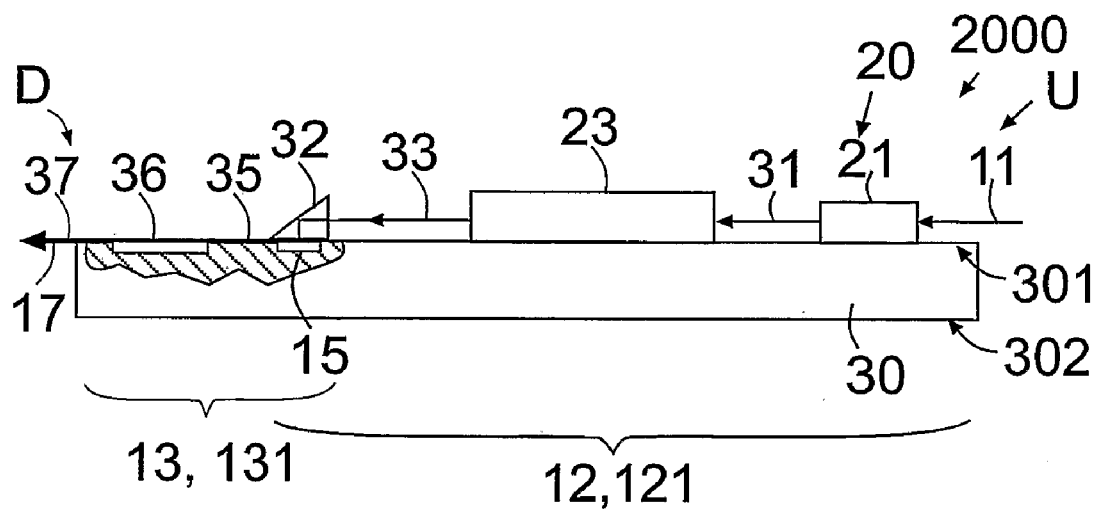
FIG. 3 shows a side view of an exemplary schematic embodiment 2000 of a monolithic photo-spectrometer unit 20.

FIG. 3 shows a side view of an exemplary schematic embodiment 2000 of a monolithic photo-spectrometer unit 20, or PSU 20, configured as a device built out of a single piece of substrate material.

In FIG. 3 the substrate material 30 out of which the entirety of the PSU 20 is manufactured is depicted as a block of generally parallelepiped shape having a first input surface 301 and a second receiving surface 302. The PSU 20 has an upstream side and a downstream side designated in FIG. 3 by arrows marked, respectively, U and D. The terms "incoming" and "outgoing" are related to respectively, the upstream side and the downstream side of the substrate material 30 and of the spectrometry system 100.

The substrate material 30 is selected as a suitable material appropriate for the purpose at hand, including being optically transparent to incoming radiations. The various optical means 12 of the embodiment 2000 shown in FIG. 3 are integrally formed on the input surface 301 of the PSU 20.

On the upstream side of the PSU 20 of embodiment 2000, optical guiding means 11, preferably implemented as optical fibres, are coupled to an optical coupler 21 formed as an integral portion of the substrate material 30. The optical coupler 21 optically aligns received incoming input signals for transfer downstream by direct optical path coupling to a wavelength separator means 14, here an optical prism 23, as shown by the arrow 31. The optical prism 23 is also an integral portion of the substrate material 30, which is suitably selected, for example only, as a slab of silicon, of silicone dioxide, or of spinel.

The optical prism 23 separates the incoming radiations into rays of different wavelength that are all directed toward an optical deflecting element 32, for example a deflecting mirror, or a prism formed on the input surface 301. The deflecting element 32 is formed on top of the detection means 15, and is thus coupled in direct optical path coupling to detection means 15. Although described as an electronic element 131, the detection means 15 are actually a photo-electronic element.

The detection means 15 are possibly implemented for example as a common detector 25, or as an array of separate single wavelength dedicated optical detectors 25$j$, or as a combination of the last two. The rays outgoing from the optical prism 23 reach the detection means 15, via the optical deflecting element 32, by direct optical path coupling designated as arrow 33. In this specific embodiment 2000, the deflecting element 32 is bonded to the input surface 301 after the formation thereon of the detection means 15.

Electrical measurable output signals emanating from the detection means 15 are coupled via electrical conducting means such as one or more electrical paths 35, to an electronic circuit 36, deposited on the input surface 301 of the substrate material 30, and include suitably selected processing means 16. The processing means 16 may include a common processor 26, single separate processors 26$k$, or a combination of the last two. Once the electrical signals received from the detection means 15 are duly processed, PSU output signal(s) 37, indicated symbolically by the arrow marked 37, is or are available for coupling to different apparatus, including I/O devices of various types. The electronic circuit 36 may also be configured to transmit the output signal(s) 37 downstream as wire communicated and/or as wireless communicated signals.

Figure 4:
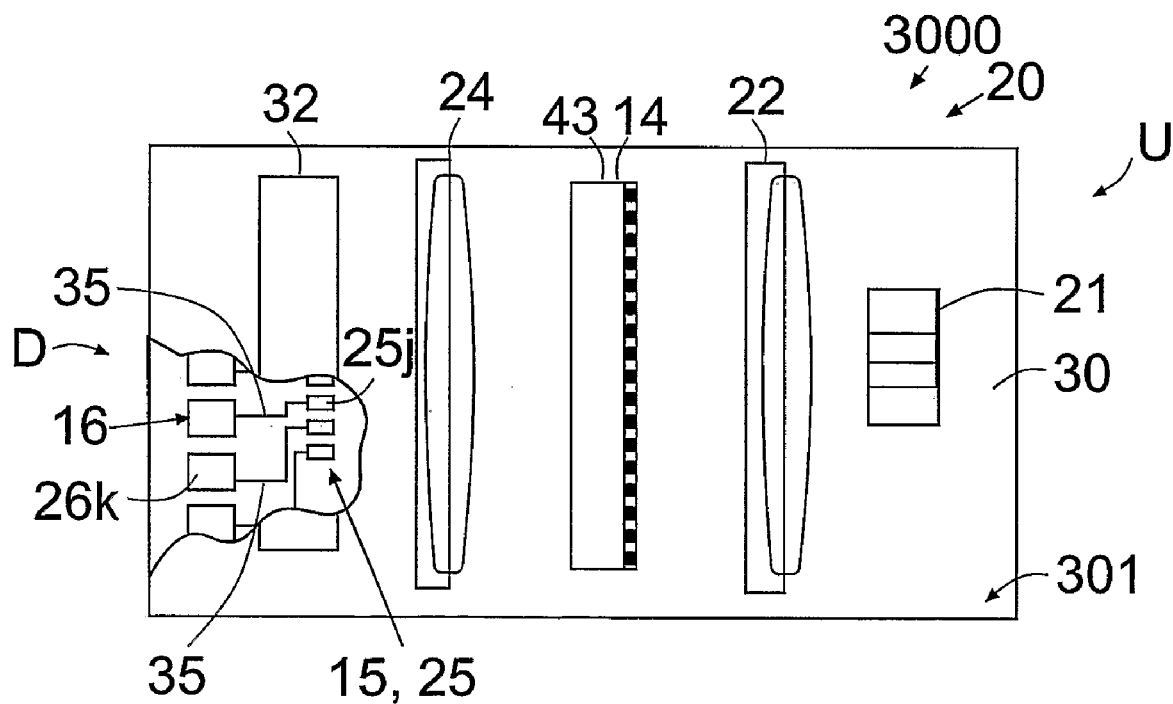
FIG. 4 presents a schematic top elevation of an exemplary embodiment 3000 of a monolithic photo-spectrometer unit 20.
Figure 5:
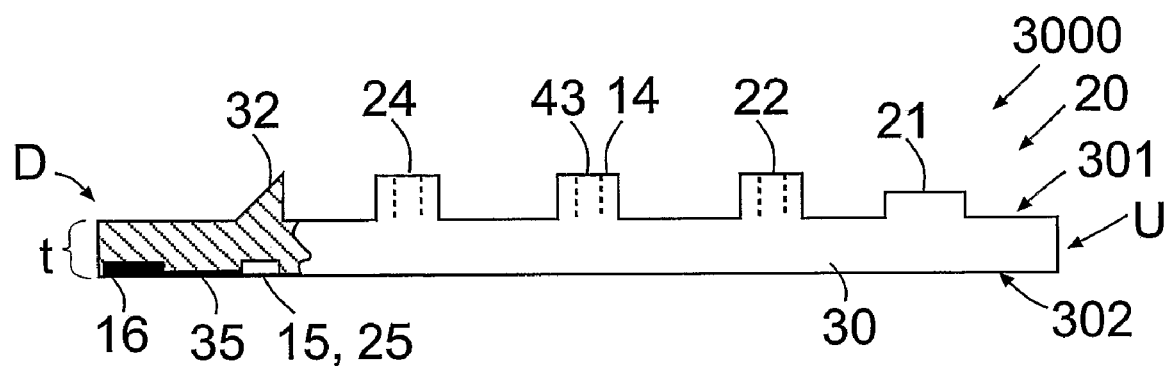
FIG. 5 is a side elevation of FIG. 4.

FIGS. 4 and 5 present, respectively, a schematic top elevation and a schematic side elevation of another exemplary embodiment 3000 of a monolithic photo-spectrometer unit 20, or PSU 20 that may be formed in two manufacturing process steps.

In FIGS. 4 and 5 the substrate material 30 out of which the entirety of the PSU 20 is manufactured is depicted as a block of generally parallelepiped shape or other shape having an input surface 301 and a receiving surface 302. Preferably, but not necessarily, the input surface 301 is parallel to the receiving surface 302. The substrate material 30 has an upstream side and a downstream side designated by arrows marked, respectively, U and D. The terms "incoming" and "outgoing" are related to respectively, the upstream side and the downstream side of the substrate material 30.

Like the embodiment 2000, the embodiment 3000 also requires for the substrate material 30 to be selected appropriately, thus at least as a material also including the property of being optically transparent to incoming radiations to be analyzed.

In the exemplary embodiment 3000, the various optical means 12 of the PSU 20 are formed as an integral portion of the substrate material 30, and are built on the input surface 301, while the electronic means 13 are manufactured on the receiving surface 302. The building procedure for implementing the structure of the PSU 20, such as by building, carving or growing, may be achieved by applying a first manufacturing process step using methods and technologies well known to the art, such as optical substrate dry etching, electron beam milling, ion beam milling, and lithography. To complete the PSU 20 as a finished product, a second manufacturing process step is applied to form the electronic means 13, and possibly for enhancing the optical means 12, say for film deposition, including mainly deposition processes, and if desired, a combination of the techniques well known to the art.

The input surface 301 of the PSU 20 may be built to form optical means 12, such as different optically aligned elements including for example from upstream U to downstream D: coupling means such as an optical coupler 21, input optics such as collimating optics 22, radiation collecting and separation means 14 such as a grating 43, focusing optics 24, and an optical deflecting element 32.

Electronic means 13 may be integrated on the receiving surface 302 of the PSU 20, still from upstream U to downstream D, including for example detection means 15, electrical conducting means such as at least one electrical path 35, signal processing means 16 possibly including electronic circuits if desired, and a signal output coupling 49 not shown in FIGS. 4 and 5 for the sake of clarity, via which PSU output signal(s) 37 are transmitted as spectrometry result output signals.

The integrally-formed optical coupler 21 may accept direct optical path coupling or be implemented as an optical or fiber optics connector 21 configured for receiving incoming optical signals from an upstream optical guiding means 11 such as an optical fiber. The optical coupler 21 may output radiations in desired optical alignment for proper coupling with the optical elements 121 aligned downstream on the input surface 301 of the PSU 20. For example, the optical coupler 21 may output optically aligned radiations by direct optical path coupling to the input or collimating optics 22.

Arrows designating the optical path of the optical rays are deleted from FIGS. 4 and 5 for the sake of clarity. Incoming radiations proceed from upstream U to downstream D in succession through the optical coupler 21, the collimating optics 22, the grating 43, the focusing optics 24, the deflecting element 32, the detection means 15, via the electrical path(s) 35, the signal processing means 16, and the signal output coupling 49.

The input optics, possibly collimating optics 22, are built downstream of and if desired, in parallel to the optical coupler 21. Optically aligned signals received from the optical coupler 21 are optically treated and may be optically coupled to grating 43 built downstream of the collimating optics 22.

The grating 43 implementing a wavelength separation means 14 is intended for operation in matching association with the detection means 15, as explained hereinbelow.

Pick-up optics, such as the focusing optics 24, may be formed downstream of and for the collection of radiations exiting from the grating 43. From the focusing optics 24, radiations are transmitted by direct optical path coupling to the optical deflecting element 32 built downstream of the focusing optics 24.

Although the optical deflecting element 32 is built integrally with the PSU 20, some implementations may function only after at least some surface thereof is treated during the second manufacturing process step, say by deposition of a reflecting layer, to become a deflecting mirror able to accept radiations, such as from the focusing optics 24 and to deflect the received radiations toward the detection means 15.

The detection means 15, possibly a common detector 25, or an array of, or separate single wavelength dedicated optical detectors 25j, are deposited on the receiving surface 302 of the PSU 20, and receive radiations reflected by the deflecting element 32 through the thickness t of the substrate material 30, which thickness t separates the input surface 301 from the receiving surface 302. It is noted that the receiving surface 302 must not necessarily be parallel to the input surface 301, but it is imperative that the deflecting element 32 and the detection means 15 be mutually appropriately configured and oriented to allow proper reception by the detection means 15 of radiations emanating from the deflecting element 32.

Still on the receiving surface 302 of the PSU 20, electrical conducting means such as deposited electrical conductors or electrical paths 35, deliver electrical data as output signals from the detection means 15 to the signal processing means 16.

Next to last, signal-processing means 16, which receive the output from the detection means 15, may be formed as a common processor 26, or as an array of, or as single separate processors 26k, or as a combination thereof. It is irrelevant whether the signal processing means 16 are deposited downstream D or upstream U of the detection means 15. If desired the signal processing means 16 may even be manufactured on the input surface 301. In that case an electrical lead needs to be fabricated to couple the detection means 15 to the signal processing means 16.

Finally, although not shown in FIGS. 4 and 5 for the sake of clarity, the output from the signal processing means 16 is electrically coupled to a signal output coupling 49, such as one or more electrical pads for example.

Figure 6:
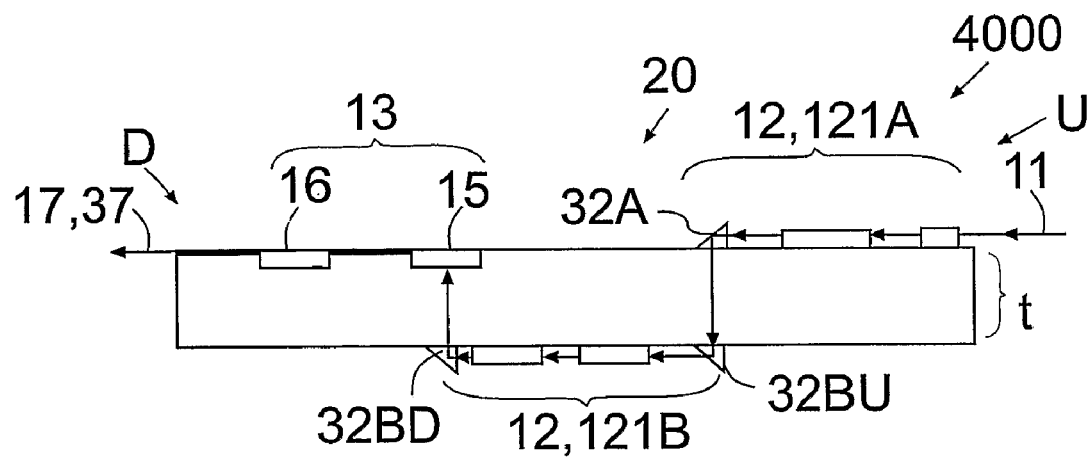
FIG. 6 depicts a side view of an exemplary schematic embodiment 4000 of a monolithic photo-spectrometer unit 20.

FIG. 6 presents a further embodiment 4000 of the PSU 20, where optical means 12 are formed on both the input surface 301 and the receiving surface 302 of the radiation transparent substrate 30, and electronic means 13 are made on the input surface 301.

As shown in FIG. 6, the PSU 20 may be fabricated in a first manufacturing process step by forming a first group of optical elements 121 designated as 121A on the input surface 301 and a second group of optical elements 121 designated as 121B on the receiving surface 302. The most downstream optical element in the first group of optical elements 121A is an optical deflecting element 32, indicated as 32A. In the second group of optical element 121B, the most upstream and the most downstream optical element 121B are optical deflecting elements 32 designated as, respectively 32BU and 32BD. The upstream deflecting element 32BU is formed in proper optical alignment to collect radiations transmitted by the optical deflecting element 32A.

Radiations incoming on the input surface 301, say through optical guiding means 11, are received by the first group of optical elements 121A and reach the optical deflecting element 32A from where they are deflected through the thickness t of the substrate 30 to impinge on the upstream deflecting element 32BU. Then, the radiations travel along the receiving surface 302 from the upstream deflecting element 32BU to the downstream deflecting element 32BD. In turn, the downstream deflecting element 32BD sends the received radiations back to the input surface 301, again through the thickness t of the radiation transparent substrate 30, where they are received by detection means 15. Evidently the deflecting element 32BD and the detection means 15 must be formed, in proper mutual optical alignment to permit appropriate transmission of radiations.

It is on the input surface 301 that the detection means 15 pertaining to the electronic elements 131 collect the radiations received from the optical elements 121B. From there, as explained hereinabove in relation to FIGS. 4 and 5, electrical signals may pass from the detection means 15 to the processing means 16, and possibly to more electronic elements 131, before exiting as PSU output signals 37 or as spectrometry result output signals 17.

Optical elements 121 may thus be formed if desired, on either one of both and on both the input surface 301 and the receiving surface 302 of the substrate 30. The same is true for electronic elements 131, which must be mutually coupled by an electrical lead. Likewise, if desired, radiations may cross the thickness t of the substrate 30 as many times as desired.

Figure 7:
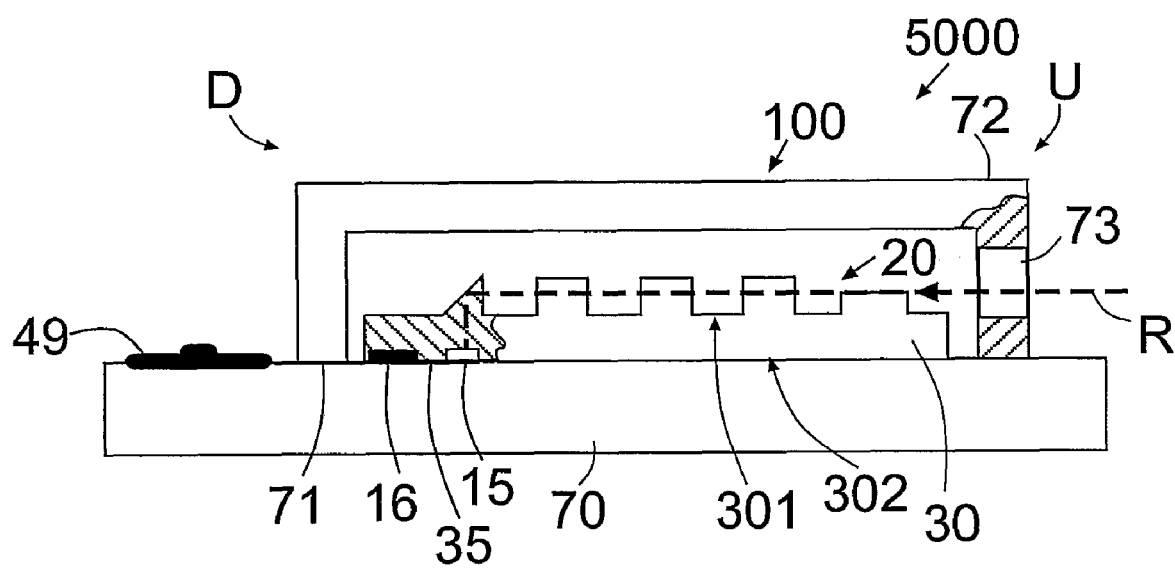
FIG. 7 illustrates a cross-section of a packaged spectrometry system 100 as embodiment 5000.

FIG. 7 illustrates a cross-section of a packaged spectrometry system 100 as embodiment 5000. The PSU 20 may be supported on a base 70, possibly a printed circuit board, or PCB, or ceramics, or any other appropriately selected base material. Radiations incoming from upstream U and indicated by a dotted line marked as R, travel along the input surface 301 up to the deflecting element 32 to reach the receiving surface 302 via the thickness t of the substrate 30, and there impinge on the detection means 15 wherefrom signals are forwarded to the processing means 16.

In the embodiment 5000 at least one electric conducting path 71 conducts the output of the processing means 16 to a signal output coupling 49 from which those signals may be led by wire or transmitted by wireless communication to an I/O device for example, or to any other device such as a recording and/or transmission devices.

In FIG. 7 the PSU 20 is shown shielded by a protective cover 72, made from metal, ceramics, or other suitable material, and having an upstream inlet opening 73 to allow the unhindered passage of incoming radiations into the PSU 20.

In view of the embodiments described hereinabove, it is possible to implement various low cost types of minuscule monolithic solid-state photo-spectrometer units 20, having no moving parts, by application of two, or of a minimal number of manufacturing process steps.

In accordance with the embodiments described hereinabove, there are provided a PSU 20 and a method for implementing the PSU for use with a spectrometry system 100 having an upstream side U and a downstream side D, and having a source of radiation 10 illuminating a sample S and optical guiding means 11 for guiding radiation exiting from the illuminated sample into the PSU. Preferably the PSU may comprise optical means 12, as well as electronic means 13 including detection means 15, 25, 25j, and processing means 16, 26, 26k. The optical means 12 may include at least one optical element 121 for receiving input radiation exiting from the illuminated sample S. The electronic means 13 may have electronic elements 131 including at least detection means 15, 25, 25j formed downstream of at least one upstream optical element 121, and may be configured for receiving radiations exiting from the illuminated sample S and for outputting electrical measurable signals. The processing means 16, 26, 26k may be configured for processing the electrical signals received from the detection means 15, and for outputting spectrometry result output signals 17.

The PSU 20 and the method for implementing the PSU are characterized by the application of only two, or of a minimal number of manufacturing process steps. First, there is applied a first manufacturing process step to form the PSU as a chip of substrate material 30 having a monolithic structure including integrally formed optical means 12, and having a first input surface 301 which is separated away from a second receiving surface 302 by a substrate material thickness t. Second, there is applied a second manufacturing process step to form the electronic means 13 onto the PSU structure, and optionally enhancing selected optical elements 121, whereby the PSU may be implemented in two manufacturing process steps.

Still in accordance with the embodiments described hereinabove, the optical means 12 may have at least one optical element 121, which is formed on the input surface 301 and the electronic means 13 may have at least one electronic element 131, which is formed on the receiving surface 302. Furthermore, the electronic means 13 may include circuits selected alone and in combination from the group consisting of electronic circuits 36 and wireless transmission circuits.

In further accordance with the embodiments described hereinabove, the substrate material may be selected as a material transparent to electromagnetic radiations, for example IR radiations, and the optical means 12 may include at least one optical deflecting element 32 configured for guiding received radiations through the thickness t of the substrate material for establishing direct optical path coupling between both an element formed on one surface and an element formed on another surface of the substrate material. Moreover, the at least one optical deflecting element 32 may be formed on the input surface 301 and be configured for guiding upstream received radiations downstream through the thickness t of the substrate material, for establishing direct optical path coupling between both at least one optical element 121 disposed on the input surface 301 and at least one electronic element 131 formed on the receiving surface 302. In addition, the optical means 12 may include at least one optical deflecting element 32 receiving radiations from upstream optical means 12 and deflecting radiations to the detection means 15 by direct optical path coupling through the thickness t of the substrate material.

In additional accordance with the embodiments described hereinabove, the optical means 12 may include optical elements 121 selected alone and in combination from the group consisting of optical couplers 21, collimating optics 22, focusing optics 24, wavelength separation means 14, optical prisms 23, and optical deflecting elements 32.

In still further accordance with the embodiments described hereinabove, the detection means 15 may be selected as a common detector 25, or as an array of detectors 25, or as separate single wavelength dedicated optical detectors 25j. Likewise, the processing means 16 may be selected as a single processor 26, or as an array of, or as separate processors 26k, and may include electronic circuits 36.

In yet further accordance with the embodiments described hereinabove, the optical means 12 may be formed at least on the input surface 301 and the electronic means 13 may formed at least on the receiving surface 302.

In yet additional accordance with the embodiments described hereinabove, the PSU may further comprise a signal output coupling 49 for output of the spectrometry output signals 17, and the PSU 20 may be configured for output of the spectrometry result output signals to an I/O device, or to any other device.

Moreover, in additional accordance with the embodiments described hereinabove, the spectrometry result output signals 17 may be transmitted downstream by means including wire communication and wireless communication.

In further additional accordance with the embodiments described hereinabove, either one of both, or both the spectrometry system 100 and the PSU 20 may be formed out of bio-compatible material allowing operation in vivo, and may be configured as a releasably adhesive pad for skin-application.

In yet further additional accordance with the embodiments described hereinabove, the application of the first manufacturing process step forms the optical means 12 on a surface such as the input surface 301 and/or on the receiving surface 302. Likewise, the application of the second manufacturing process step forms at least the electronic means 13 on a surface such as the input surface 301 and/or the receiving surface 302. Moreover, the application of the second manufacturing process step may enhance the performance of the optical means 12 formed by application of the first manufacturing process step.

In accordance with the embodiments described hereinabove, the application of the two-step manufacturing process allows to achieve miniaturization and cost-effective implementation of the PSU 20, which may become a disposable unit. Such a minuscule and cost-effective PSU 20 may be used as a stand alone unit, but also permits integration into medical systems, and into medical systems having at least one disposable portion. PSU 20 may be integrated in semi-closed loop systems and in closed loop systems. Medical systems are meant to include medical apparatus and medical devices.

The embodiments described hereinabove also are relevant to diabetes mellitus patients who require the administration of varying amounts of insulin throughout the day to control their blood's glucose concentration levels. In such cases, a spectrometry system 100 with a PSU 20 may be used to precisely measure glucose concentration levels for example in the blood of a patient or in interstitial fluid ISF, and determine the dose of medication or insulin to be injected. Furthermore, by forming the PSU 20 out of bio-compatible material, it is possible to operate in various modes such as for example running the PSU 20 ex vivo, and in vivo. Ex vivo operation of the PSU 20 may include application of the PSU 20 on the skin of a patient as an adhesive releasable patch, or in any other desired mode of operation. Examples of in vivo operation may include implantation and other desired modes of in vivo operation.

INDUSTRIAL APPLICABILITY

The embodiments described hereinabove are suitable for application in industry, and particularly in the industry of medical devices.

It will be appreciated by persons skilled in the art, that the present invention is not limited to what has been particularly shown and described hereinabove. For example, radiations transmitted by detection means 15 may be conducted to more than one optical deflecting element 32 and from there to different signal processing means 16. Rather, the scope of the present invention is defined by the appended claims and includes both combinations and subcombinations of the various features described hereinabove as well as variations and modifications thereof which would occur to persons skilled in the art upon reading the foregoing description.

LIST OF ITEMS

Figure 1:
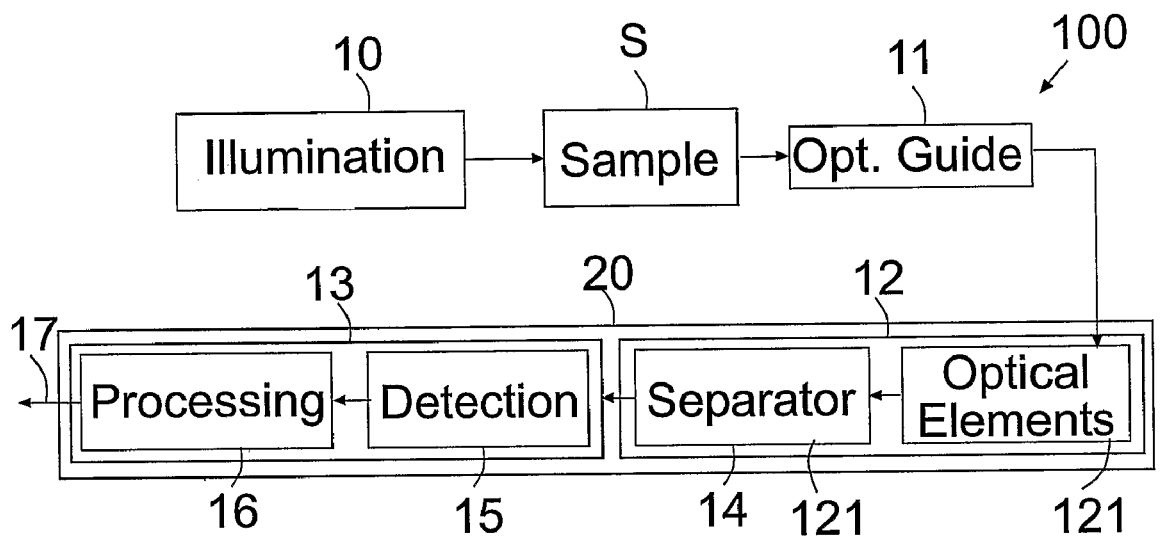
FIG. 1 is a schematic block-diagram representation of known prior art systems for the analysis of a sample by spectroscopy.

FIG. 1
S sample S
10 illumination means 10 source
10$i$, where i=[1, 2, 3, m],
11 optical guiding means 11
111 optical guiding element 111
12 optical means 12
121 optical element 121
13 electronic means 13
131 electronic element 131
14 separator means 14
15 detection means 15
16 signal processing means 16
17 spectrometry result output signals 17
18
19
FIG. 2
1000 embodiment 1000
100 spectrometry system 100
U upstream side U
D downstream side D
20 photo-spectrometer unit 20, or PSU 20
21 optical coupler 21
22 collimating optics 22
23 optical prism 23
24 focusing optics 24
25 common detector 25
25$j$, with j [1, 2, 3 . . . n]
25$j$ separate single wavelength dedicated optical detectors 25$j$,
26 common processor 26
26$k$, with k=[1, 2, 3 . . . p]
26$k$ single separate processors 26$k$
27
28
FIG. 3
2000 embodiment 2000
100 spectrometry system 100
20 photo-spectrometer unit 20, or PSU 20
30 substrate material 30'
301 first input surface 301
302 receiving surface 302
31 arrow 31
32 optical deflecting element 32
321 optical deflecting mirror 32
33 arrow 33
15 detection means 15
35 electrical path 35
36 electronic circuit 36
37 PSU output signal(s) 37'
FIGS. 4 and 5
3000 embodiment 3000
30 substrate material 30'
301 input surface 301
302 receiving surface 302
40
21 optical coupler 21
22 collimating optics 22
43 grating 43
44 focusing optics 24
45 optical deflecting element 32
15 detection means 15

35 electrical path 35
16 signal processing means 16
49 signal output coupling 49
FIG. 6
4000 embodiment 4000
100 spectrometry system 100
301 input surface 301
302 receiving surface 302
121A first group of optical element 121A
121B second group of optical element 121B
32A optical deflecting element 32A on 301
32BU optical deflecting element 32BU on 302
32BD optical deflecting element 32BD on 302
FIG. 7
5000 embodiment 5000
100 spectrometry system 100
49 signal output coupling 49
70 base 70
71 conducting path 71
72 protective cover 72
73 inlet opening 73

The invention claimed is:

1. A method for manufacturing a photo-spectrometer unit for use with a spectrometry system, said photo-spectrometer unit having an upstream side and a downstream side, and said spectrometry system having a source of radiation illuminating a sample and an optical guide for guiding radiation exiting from the sample into the photo-spectrometer unit, said photo-spectrometer unit comprising:
at least one optical element for receiving input radiation exiting from the sample, and electronic elements including:
a detector formed downstream of at least one optical element and configured for receiving radiation exiting from the sample and for outputting electrical measurable signals, and
a processor configured for processing the electrical measurable signals received from the detector, and for outputting spectrometry result output signals,
the method comprising the steps of:
forming the photo-spectrometer unit as a chip of a substrate material, said chip having a monolithic structure with the at least one optical element formed integrally therefrom, and said chip having a generally planar first surface on which said at least one optical element is formed such that, in operation, said input radiation travels into and exits out of said at least one optical element generally parallel to said first surface, said first surface being separated by a thickness of substrate material from a second, opposite surface, and
forming the electronic elements on said second surface of said chip.

2. The method according to claim 1, wherein:
the electronic elements further include circuits selected alone or in combination from the group consisting of electronic circuits and wireless transmission circuits.

3. The method according to claim 1, wherein:
the at least one optical element includes optical elements selected alone or in combination from the group consisting of optical couplers, collimating optics, focusing optics, wavelength separation means, and optical prisms.

4. The method according to claim 1, wherein:
the detector is selected alone or in combination from the group consisting of: a single common detector, an array of detectors, and separate single wavelength dedicated optical detectors.

5. The method according to claim 1, wherein:
the processor is selected alone or in combination from the group consisting of a single processor, an array of processors, and electronic circuits.

6. The method according to claim 1, wherein:
the photo-spectrometer unit further comprises a signal output coupling for outputting the spectrometry output signal.

7. A photo-spectrometer unit for use with a spectrometry system, said spectrometry system having an upstream side and a downstream side, and having a source of radiation for illuminating a sample and an optical guide for guiding radiation exiting from the sample into the photo-spectrometer unit, said photo-spectrometer unit comprising:
at least one optical element for receiving input radiation exiting from the sample, and
electronic elements including:
a detector formed downstream of at least one optical element, the detector being configured for receiving radiation exiting from the sample and for outputting electrical measurable signals, and
a processor configured for processing the electrical measurable signals received from the detector, and for outputting spectrometry result output signals,
said photo-spectrometer unit being formed as a chip of a substrate material, said chip having a monolithic structure with the at least one optical element formed integrally therefrom, and said chip having a generally planar first surface and a second surface located on opposite sides of a thickness of substrate material, said at least one optical element being formed on said first surface such that, in operation, said input radiation travels into and exits out of said at least one optical element generally parallel to said first surface, and said electronic elements being formed on said second surface.

8. The photo-spectrometer unit according to claim 7, wherein:
the electronic elements further include circuits selected alone or in combination from the group consisting of electronic circuits and wireless transmission circuits.

9. The photo-spectrometer unit according to claim 7, wherein:
the at least one optical element includes optical elements selected alone or in combination from the group consisting of optical couplers, collimating optics, focusing optics, wavelength separation means, and optical prisms.

10. The photo-spectrometer unit according to claim 7, wherein:
the detector is selected alone or in combination from the group consisting of a single common detector, an array of common detectors, and separate single wavelength dedicated optical detectors.

11. The photo-spectrometer unit according to claim 7, wherein:
at least the photo-spectrometer unit is implemented as a disposable component of a medical system.

12. The photo-spectrometer unit according to claim 7, wherein:
in operation said input radiation traveling into and exiting out of said at least one optical element generally parallel to said first surface also travels outside of the substrate material generally parallel to said first surface.

13. The photo-spectrometer unit according to claim 7, wherein:
said first surface and said second surface overlap; and said thickness of substrate material between said first surface and said second surface is generally uniform along the full area of overlap of said first surface and said second surface.

14. The photo-spectrometer unit according to claim 7, wherein:
said second surface is generally planar.

15. The photo-spectrometer unit according to claim 7, wherein:
said first surface and said second surface are generally parallel.

16. The method according to claim 1, wherein:
forming said photo-spectrometer unit comprises forming said photo-spectrometer unit such that, in operation, said input radiation traveling into and exiting out of said at least one optical element generally parallel to said first surface also travels outside of the substrate material generally parallel to said first surface.

17. The method according to claim 1, wherein:
forming said photo-spectrometer unit comprises forming said photo-spectrometer unit such that said first surface and said second surface overlap; and said thickness of substrate material between said first surface and said second surface is generally uniform along the full area of overlap of said first surface and said second surface.

18. The method according to claim 1, wherein:
forming said photo-spectrometer unit comprises forming said photo-spectrometer unit such that said second surface is generally planar.

19. The method according to claim 1, wherein:
forming said photo-spectrometer unit comprises forming said photo-spectrometer unit such that said first surface and said second surface are generally parallel.

20. A method for manufacturing a photo-spectrometer unit for use with a spectrometry system, said photo-spectrometer unit having an upstream side and a downstream side, and said spectrometry system having a source of radiation illuminating a sample and an optical guide for guiding radiation exiting from the sample into the photo-spectrometer unit, said photo-spectrometer unit comprising:
a plurality of optical elements, said plurality of optical elements comprising a first optical element and an optical deflecting element, and
electronic elements including:
a detector formed downstream of said plurality of optical elements and configured for receiving radiation exiting from the sample and for outputting electrical measurable signals, and
a processor configured for processing the electrical measurable signals received from the detector, and for outputting spectrometry result output signals,
the method comprising the steps of:
forming the photo-spectrometer unit as a chip of a substrate material, said chip having a monolithic structure with the plurality of optical elements formed integrally therefrom, and said chip having a generally planar first surface on which said plurality of optical elements are formed such that, in operation, said input radiation travels into and exits out of said first optical element generally parallel to said first surface, and into said optical deflecting element for guidance through the substrate material in a direction that is non-parallel to said first surface, said first surface being separated by a thickness of substrate material from a second, opposite surface; and
forming the electronic elements on said second surface of said chip;
wherein the substrate material is transparent to electromagnetic radiation; and
wherein said optical deflecting element is configured to establish optical path coupling between an optical element formed on the first surface and an electronic element formed on the second surface.

21. The method according to claim 20, wherein:
forming said photo-spectrometer unit comprises forming said photo-spectrometer unit such that said optical deflecting element is configured to establish direct optical path coupling between said first optical element and said detector.

22. A photo-spectrometer unit for use with a spectrometry system, said spectrometry system having an upstream side and a downstream side, and having a source of radiation for illuminating a sample and an optical guide for guiding radiation exiting from the sample into the photo-spectrometer unit, said photo-spectrometer unit comprising:
a plurality of optical elements, said plurality of optical elements comprising a first optical element and an optical deflecting element, and
electronic elements including:
a detector formed downstream of at least one optical element, the detector being configured for receiving radiation exiting from the sample and for outputting electrical measurable signals, and
a processor configured for processing the electrical measurable signals received from the detector, and for outputting spectrometry result output signals,
said photo-spectrometer unit being formed as a chip of a substrate material, said chip having a monolithic structure with the plurality of optical elements formed integrally therefrom, and said chip having a generally planar first surface and a second surface located on opposite sides of a thickness of substrate material, said first optical element and said optical deflecting element being formed on said first surface such that, in operation, said input radiation travels into and exits out of said first optical element generally parallel to said first surface, and into said optical deflecting element for guidance through the substrate material in a direction that is non-parallel to said first surface, and said electronic elements being formed on said second surface;
wherein the substrate material is transparent to electromagnetic radiation; and
wherein said optical deflecting element is configured to establish optical path coupling between an optical element formed on the first surface and an electronic element formed on the second surface.

23. The photo-spectrometer unit according to claim 22, wherein:
said optical deflecting element is configured to establish direct optical path coupling between said first optical element and said detector.

* * * * *